United States Patent
Hattori et al.

(10) Patent No.: US 10,109,889 B2
(45) Date of Patent: Oct. 23, 2018

(54) NON-AQUEOUS ELECTROLYTE SECONDARY BATTERY

(71) Applicant: SANYO Electric Co., Ltd., Daito-shi, Osaka (JP)

(72) Inventors: Takayuki Hattori, Hyogo (JP); Yasuhiro Yamauchi, Hyogo (JP)

(73) Assignee: SANYO ELECTRIC CO., LTD., Daito-shi (JP)

( * ) Notice: Subject to any disclaimer, the term of this patent is extended or adjusted under 35 U.S.C. 154(b) by 374 days.

(21) Appl. No.: 14/900,542

(22) PCT Filed: Jun. 10, 2014

(86) PCT No.: PCT/JP2014/003085
§ 371 (c)(1),
(2) Date: Dec. 21, 2015

(87) PCT Pub. No.: WO2015/001718
PCT Pub. Date: Jan. 8, 2015

(65) Prior Publication Data
US 2016/0133995 A1  May 12, 2016

(30) Foreign Application Priority Data

Jul. 1, 2013  (JP) .................................. 2013-137936

(51) Int. Cl.
*H01M 10/42* (2006.01)
*H01M 2/34* (2006.01)
(Continued)

(52) U.S. Cl.
CPC ......... *H01M 10/4235* (2013.01); *H01M 2/34* (2013.01); *H01M 2/345* (2013.01);
(Continued)

(58) Field of Classification Search
CPC .......................... H01M 2/345; H01M 10/4235
(Continued)

(56) References Cited

U.S. PATENT DOCUMENTS

| 5,427,875 A | 6/1995 | Yamamoto et al. |
| 2004/0121239 A1 | 6/2004 | Abe et al. |

(Continued)

FOREIGN PATENT DOCUMENTS

| CN | 101834306 A | 9/2010 |
| CN | 102007623 A | 4/2011 |

(Continued)

OTHER PUBLICATIONS

English Translation of Chinese Search Report dated Feb. 27, 2017, issued in counterpart Chinese Patent Application No. 201480036026. X. (1 page).

(Continued)

*Primary Examiner* — Basia A Ridley
*Assistant Examiner* — James M Erwin
(74) *Attorney, Agent, or Firm* — Westerman, Hattori, Daniels & Adrian, LLP

(57) ABSTRACT

A nonaqueous electrolyte secondary battery includes a positive electrode plate including a positive electrode core and a positive electrode mixture layer formed thereon; a negative electrode plate including a negative electrode core and a negative electrode mixture layer formed thereon; a wound electrode assembly in which the positive electrode plate and the negative electrode plate are wound with a separator therebetween so as to be insulated from each other; a nonaqueous electrolyte solution; a pressure-responsive current interruption mechanism electrically connected to at least one of the positive electrode plate and the negative electrode plate; and an outer casing. Excess electrolyte solution is present outside the electrode assembly in the (Continued)

outer casing. The liquid level of the excess electrolyte solution is at such a height that the excess electrolyte solution does not come into contact with a component of the current interruption mechanism when the outer casing is placed horizontally.

20 Claims, 6 Drawing Sheets

(51) Int. Cl.
    *H01M 10/0566*     (2010.01)
    *H01M 10/0587*     (2010.01)
    *H01M 10/052*     (2010.01)
    *H01M 4/62*     (2006.01)

(52) U.S. Cl.
    CPC ........... *H01M 4/62* (2013.01); *H01M 10/052* (2013.01); *H01M 10/0566* (2013.01); *H01M 10/0587* (2013.01); *H01M 2200/20* (2013.01); *H01M 2220/20* (2013.01); *Y02E 60/122* (2013.01); *Y02T 10/7011* (2013.01)

(58) Field of Classification Search
    USPC .......................................................... 429/61
    See application file for complete search history.

(56) References Cited

U.S. PATENT DOCUMENTS

| | | |
|---|---|---|
| 2008/0038628 A1 | 2/2008 | Yamauchi et al. |
| 2008/0050658 A1 | 2/2008 | Abe et al. |
| 2008/0182175 A1 | 7/2008 | Okazaki et al. |
| 2010/0233529 A1 | 9/2010 | Nansaka et al. |
| 2011/0039160 A1 | 2/2011 | Takahata et al. |
| 2011/0177364 A1* | 7/2011 | Miyazaki .............. H01M 4/131 429/53 |
| 2012/0208051 A1 | 8/2012 | Tsukiji et al. |
| 2012/0315515 A1* | 12/2012 | Guen .................. H01M 2/0473 429/56 |
| 2013/0095352 A1 | 4/2013 | Yamauchi et al. |
| 2013/0337305 A1 | 12/2013 | Nagai et al. |

FOREIGN PATENT DOCUMENTS

| | | |
|---|---|---|
| CN | 103403942 A | 11/2013 |
| JP | 4-328278 A | 11/1992 |
| JP | 2006-156268 A | 6/2006 |
| JP | 2008-066255 A | 3/2008 |
| JP | 2008-186792 A | 8/2008 |
| JP | 2013-20930 A | 1/2013 |
| WO | 02/59999 A1 | 8/2002 |
| WO | 2012/042743 A1 | 4/2012 |

OTHER PUBLICATIONS

International Search Report dated Sep. 16, 2014, issued in counterpart application No. PCT/JP2014/003085 (2 pages).

* cited by examiner

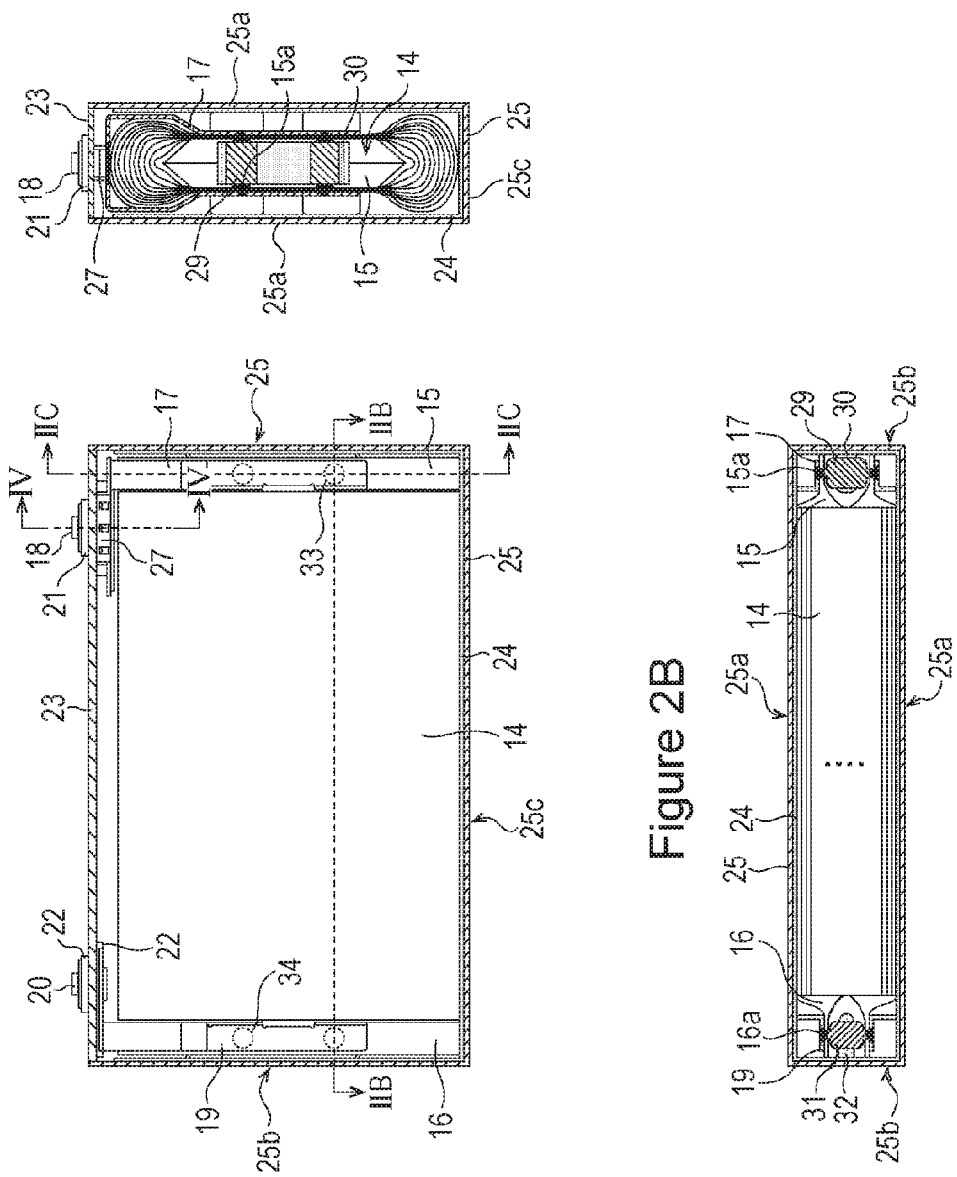

NON-AQUEOUS ELECTROLYTE SECONDARY BATTERY

TECHNICAL FIELD

The present invention relates to nonaqueous electrolyte secondary batteries for automotive applications.

BACKGROUND ART

Nonaqueous electrolyte secondary batteries for automotive applications such as power supplies for driving electric vehicles (EVs) and hybrid electric vehicles (HEVs and PHEVs) have a pressure-responsive current interruption mechanism as well as an explosion-proof safety valve. The pressure-responsive current interruption mechanism is activated by gas rapidly generated inside the battery in the event of an abnormal condition and interrupts the incoming current to prevent the battery from rupturing or catching fire.

One of the known techniques for increasing the capacity of nonaqueous electrolyte secondary batteries is to increase the charging voltage. Also known is a safety measure against the overcharging of nonaqueous electrolyte secondary batteries by the addition of overcharging inhibitors such as tert-amylbenzene, biphenyl (see PTL 1), cycloalkylbenzenes, and compounds having a quaternary carbon adjacent to a benzene ring (see PTL 2) to nonaqueous electrolyte solutions. Unfortunately, if the charging voltage is increased in order to improve the battery capacity, the overcharging inhibitor may decompose within the voltage range set as the normal operating range, depending on the type of overcharging inhibitor. This may result in poor battery characteristics and safety after charge-discharge cycling.

To solve this problem, the addition of lithium carbonate ($Li_2CO_3$) to positive electrode mixtures for nonaqueous electrolyte secondary batteries is also known, which improves overcharging resistance (see PTL 3). If lithium carbonate is added to a positive electrode mixture for a nonaqueous electrolyte secondary battery, carbon dioxide gas is generated from the positive electrode plate when a high voltage is applied to the battery, for example, upon overcharging. This allows the pressure-responsive current interruption mechanism to be reliably activated earlier than the explosion-proof safety valve.

CITATION LIST

Patent literature

PTL 1: International Publication No. 2002/059999
PTL 2: Japanese Published Unexamined Patent Application No. 2008-186792
PTL 3: Japanese Published Unexamined Patent Application No. 04-328278

SUMMARY OF INVENTION

Technical Problem

Nonaqueous electrolyte secondary batteries having a current interruption mechanism have a problem in that, after the current interruption mechanism is activated to interrupt the incoming current, any nonaqueous electrolyte solution present near the current interruption mechanism may cause the current interruption mechanism to conduct again through the nonaqueous electrolyte solution when an extraordinarily high voltage is applied thereto. Nonaqueous electrolyte secondary batteries including a nonaqueous electrolyte solution containing an overcharging inhibitor also have a problem in that a flammable gas may be generated, depending on the type of overcharging inhibitor. This flammable gas may be ignited by sparks that occur when the current interruption mechanism conducts again.

Accordingly, there is a need for further improvement in the safety of nonaqueous electrolyte secondary batteries having such configurations.

Solution to Problem

According to an aspect of the present invention, there is provided a nonaqueous electrolyte secondary battery including:

a positive electrode plate including a positive electrode core and a positive electrode mixture layer formed thereon;

a negative electrode plate including a negative electrode core and a negative electrode mixture layer formed thereon;

a wound electrode assembly in which the positive electrode plate and the negative electrode plate are wound with a separator therebetween so as to be insulated from each other;

a nonaqueous electrolyte solution;

a pressure-responsive current interruption mechanism electrically connected to at least one of the positive electrode plate and the negative electrode plate; and an outer casing, wherein excess electrolyte solution is present outside the electrode assembly in the outer casing, and the liquid level of the excess electrolyte solution is at such a height that the excess electrolyte solution does not come into contact with a component of the current interruption mechanism when the outer casing is placed horizontally.

Advantageous Effects of Invention

In the nonaqueous electrolyte secondary battery according to the aspect of the present invention, the components of the current interruption mechanism are unlikely to come into contact with the nonaqueous electrolyte solution when the outer casing is placed horizontally. Therefore, after the current interruption mechanism is activated to interrupt the incoming current, the current interruption mechanism is unlikely to conduct again when an extraordinarily high voltage is applied thereto. Thus, the current interruption mechanism in the nonaqueous electrolyte secondary battery according to the aspect of the present invention is unlikely to conduct again after the activation of the current interruption mechanism, for example, upon overcharging. This provides a nonaqueous electrolyte secondary battery with high safety.

BRIEF DESCRIPTION OF DRAWINGS

FIG. 2A is a partial sectional view taken along line IIA-IIA in FIG. 1A, FIG. 2B is a partial sectional view taken along line IIB-IIB in FIG. 2A, and FIG. 2C is a sectional view taken along line IIC-IIC in FIG. 2A.

DESCRIPTION OF EMBODIMENTS

A prismatic nonaqueous electrolyte secondary battery according to an embodiment of the present invention will now be described in detail by way of example. The following embodiment is provided for a better understanding of the technical idea of the invention and is not intended to limit the invention to the particular prismatic nonaqueous electrolyte secondary battery. The invention is amenable to various modifications that do not depart from the technical idea indicated by the claims.

[Embodiment]

Figure 3:
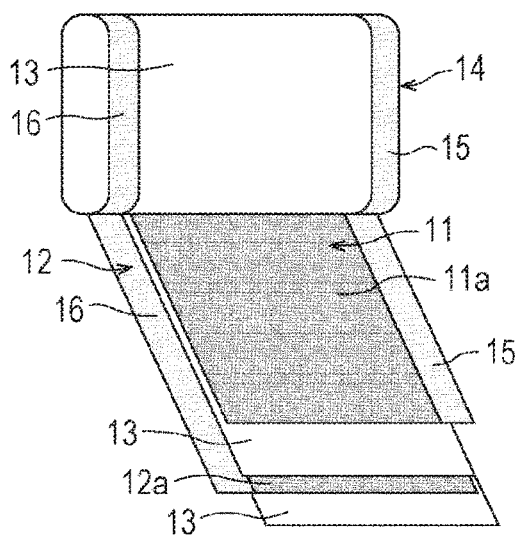
FIG. 3 is a perspective view of a flat wound electrode assembly according to the embodiment, with the winding end thereof unwound.

The structure of the nonaqueous electrolyte secondary battery according to the embodiment will be described first with reference to FIGS. 1 to 3. As shown in FIG. 3, a nonaqueous electrolyte secondary battery 10 includes a flat wound electrode assembly 14 in which a positive electrode plate 11 and a negative electrode plate 12 are wound with a separator 13 therebetween so as to be insulated from each other. The separator 13 forms the outermost surface of the flat wound electrode assembly 14, and the negative electrode plate 12 is disposed outside the positive electrode plate 11.

The positive electrode plate 11 includes a positive electrode core made of an aluminum or aluminum alloy foil and having a thickness of about 10 to 20 µm and a positive electrode mixture layer 11a formed on each side of the positive electrode core such that the positive electrode core is exposed in a strip shape along one lateral edge thereof. The strip-shaped exposed portion of the positive electrode core is referred to as "positive electrode core exposed portion 15". The negative electrode plate 12 includes a negative electrode core made of a copper or copper alloy foil and having a thickness of about 5 to 15 µm and a negative electrode mixture layer 12a formed on each side of the negative electrode core such that the negative electrode core is exposed in a strip shape along one lateral edge thereof. The strip-shaped exposed portion of the negative electrode core is referred to as "negative electrode core exposed portion 16". The positive electrode core exposed portion 15 may be formed along each lateral edge of the positive electrode plate 11, and the negative electrode core exposed portion 16 may be formed along each lateral edge of the negative electrode plate 12.

The positive electrode plate 11 and the negative electrode plate 12 are shifted from each other such that the positive electrode core exposed portion 15 and the negative electrode core exposed portion 16 do not overlap the mixture layers of the opposite electrodes and are wound in a flat shape with the separator 13 therebetween so as to be insulated from each other, thus forming the flat wound electrode assembly 14.

As shown in FIGS. 2A, 2B, and 3, the positive electrode core exposed portion 15 is laminated in layers at one end of the flat wound electrode assembly 14, and the negative electrode core exposed portion 16 is laminated in layers at the other end of the flat wound electrode assembly 14. The separator 13 is preferably a pair of microporous polyolefin films or a single long folded microporous polyolefin film, and they are wide enough to cover the positive electrode mixture layer 11a and are wider than the negative electrode mixture layer 12a.

The laminated layers of the positive electrode core exposed portion 15 are electrically connected to a positive electrode terminal 18 via a positive electrode current collector 17. A current interruption mechanism 27 is disposed between the positive electrode current collector 17 and the positive electrode terminal 18. The current interruption mechanism 27 is activated by the pressure of gas generated inside the battery. The laminated layers of the negative electrode core exposed portion 16 are electrically connected to a negative electrode terminal 20 via a negative electrode current collector 19.

Figure 1A:
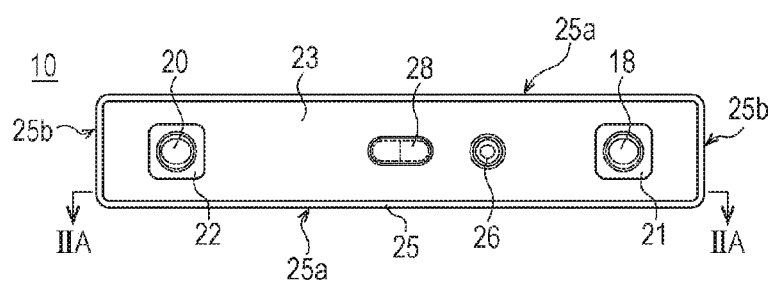
FIG. 1A is a plan view of a nonaqueous electrolyte secondary battery according to an embodiment.
Figure 1B:
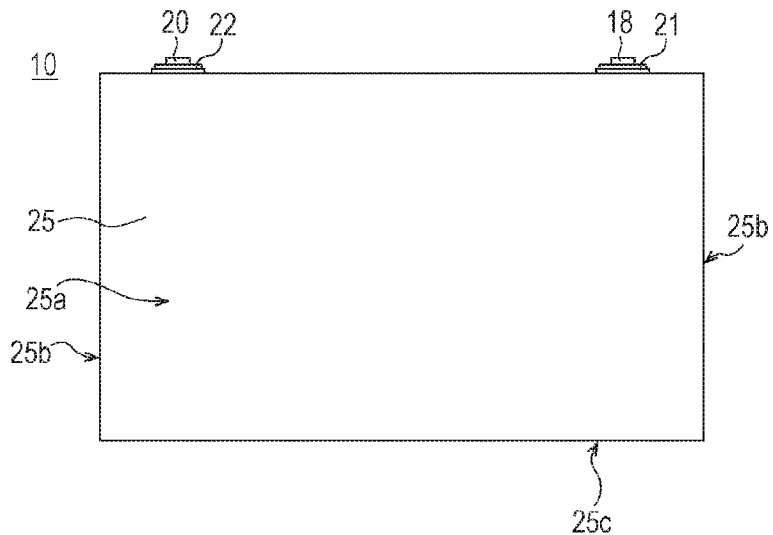
FIG. 1B is a front view of the nonaqueous electrolyte secondary battery.

As shown in FIGS. 1A, 1B, and 2A, the positive electrode terminal 18 and the negative electrode terminal 20 are fixed to a sealing member 23 with insulating members 21 and 22, respectively, therebetween. The sealing member 23 also has a gas release valve 28 that is opened when a gas pressure higher than the activation pressure of the current interruption mechanism 27 is applied thereto. The positive electrode current collector 17, the positive electrode terminal 18, and the sealing member 23 are made of aluminum or aluminum alloy. The negative electrode current collector 19 and the negative electrode terminal 20 are made of copper or copper alloy.

The flat wound electrode assembly 14 is inserted into a prismatic outer casing 25 with one open side. An insulating sheet 24 made of a resin material is disposed around the flat wound electrode assembly 14 except the side thereof opposite the sealing member 23. The prismatic outer casing 25 is made of, for example, aluminum or aluminum alloy. The sealing member 23 is fitted to the opening of the prismatic outer casing 25 and is welded thereto with a laser. A nonaqueous electrolyte solution is injected into the prismatic outer casing 25 through an electrolyte solution inlet 26. The electrolyte solution inlet 26 is hermetically sealed, for example, with a blind rivet.

A single nonaqueous electrolyte secondary battery 10 or a plurality of series-connected, parallel-connected, or series-parallel-connected nonaqueous electrolyte secondary batteries 10 are used in various applications. For example, if a plurality of series-connected or parallel-connected nonaqueous electrolyte secondary batteries 10 are used in automotive applications, an external positive electrode terminal and an external negative electrode terminal may be provided, and the individual batteries may be connected together with bus bars.

Since the flat wound electrode assembly 14 used in the nonaqueous electrolyte secondary battery 10 is intended for applications requiring high capacity and power, i.e., a battery capacity of 20 Ah or more, the positive electrode plate 11 is wound a large number of times. For example, the positive electrode plate 11 is wound 43 times, i.e., laminated in a total of 86 layers. If the positive electrode plate 11 is wound 15 or more times, i.e., laminated in a total of 30 or more layers, a battery capacity of 20 Ah or more can readily be achieved without increasing the battery size more than necessary.

If the positive electrode core exposed portion 15 or the negative electrode core exposed portion 16 is laminated in a large number of layers, a large welding current is required to form welds 15a or 16a penetrating all of the large number of laminated layers of the positive electrode core exposed portion 15 or the negative electrode core exposed portion 16 when the positive electrode current collector 17 is joined to the positive electrode core exposed portion 15 or the negative electrode current collector 19 is joined to the negative electrode core exposed portion 16 by resistance welding.

Accordingly, as shown in FIGS. 2A to 2C, the laminated layers of the wound positive electrode core exposed portion 15 of the positive electrode plate 11 converge toward the center along the thickness and are divided into two bundles, each centered at a position that is one-fourth the thickness of the flat wound electrode assembly 14, and a positive electrode intermediate member 30 is disposed therebetween. The positive electrode intermediate member 30 includes a plurality of (for example, two) positive electrode conductive members 29 supported by a substrate made of a resin material. The positive electrode conductive members 29 are, for example, cylindrical members having frustoconical ends serving as projections opposite the laminated layers of the positive electrode core exposed portion 15.

The laminated layers of the wound negative electrode core exposed portion 16 of the negative electrode plate 12 converge toward the center along the thickness and are divided into two bundles, each centered at a position that is one-fourth the thickness of the flat wound electrode assembly 14, and a negative electrode intermediate member 32 is disposed therebetween. The negative electrode intermediate member 32 includes a plurality of (in this example, two) negative electrode conductive members 31 supported by a substrate made of a resin material. The negative electrode conductive members 31 are, for example, cylindrical members having frustoconical ends serving as projections opposite the laminated layers of the negative electrode core exposed portion 16.

The positive electrode current collector 17 is disposed on both outermost surfaces of the positive electrode core exposed portion 15 located on both sides of the positive electrode conductive members 29. The negative electrode current collector 19 is disposed on both outermost surfaces of the negative electrode core exposed portion 16 located on both sides of the negative electrode conductive members 31. The positive electrode conductive members 29 are preferably made of the same material as the positive electrode core, i.e., aluminum or aluminum alloy. The negative electrode conductive members 31 are preferably made of the same material as the negative electrode core, i.e., copper or copper alloy. The shapes of the positive electrode conductive members 29 and the negative electrode conductive members 31 may be the same or different.

The method for resistance welding of the positive electrode core exposed portion 15, the positive electrode current collector 17, and the positive electrode intermediate member 30 including the positive electrode conductive members 29 and the method for resistance welding of the negative electrode core exposed portion 16, the negative electrode current collector 19, and the negative electrode intermediate member 32 including the negative electrode conductive members 31 for the flat wound electrode assembly 14 according to the embodiment are already known and are therefore not described in detail herein.

If the laminated layers of the positive electrode core exposed portion 15 or the negative electrode core exposed portion 16 are divided into two bundles, a smaller weld current is required to form welds penetrating all of the large number of laminated layers of the positive electrode core exposed portion 15 or the negative electrode core exposed portion 16a than in the case where they are not divided into two bundles. This reduces spatter during resistance welding and thus reduces problems such as internal short circuits due to spatter in the flat wound electrode assembly 14. FIG. 2A shows two welds 33 formed in the positive electrode current collector 17 by resistance welding and also shows two welds 34 in the negative electrode current collector 19.

Figure 4:
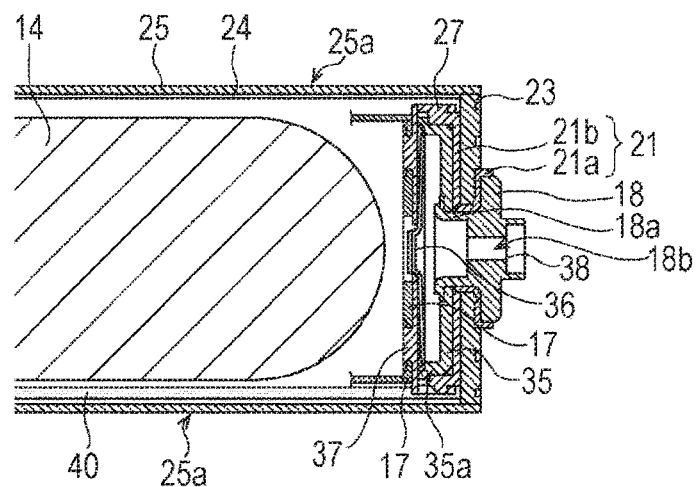
FIG. 4 is a schematic sectional view taken along line IV-IV in FIG. 2A.

The specific structure of the current interruption mechanism 27 will now be described. As shown in FIGS. 2A to 2C, the positive electrode core exposed portion 15, which is located on one side of the flat wound electrode assembly 14, is connected to the positive electrode current collector 17, which is electrically connected to the positive electrode terminal 18. As shown in FIG. 4, the positive electrode terminal 18 includes a tubular portion 18a having a through-hole 18b therein. A conductive member 35 forming part of the structure of the current interruption mechanism 27 includes a tubular portion 35a at the inner side of the battery, and the inner diameter thereof decreases toward the outer side of the battery, i.e., toward the sealing member 23, thereby forming an opening through which the tubular portion 18a of the positive electrode terminal 18 is inserted.

The tubular portion 18a of the positive electrode terminal 18 is inserted into openings formed in an upper first insulating member 21a such as a gasket, the sealing member 23, a lower first insulating member 21b, and the conductive member 35. The upper first insulating member 21a and the lower first insulating member 21b correspond to the insulating member 21 in FIGS. 2A and 2B. An end of the tubular portion 18a of the positive electrode terminal 18 is integrally fixed around the opening in the conductive member 35 by crimping and is welded thereto with a laser. The positive electrode terminal 18 is thus electrically connected to the conductive member 35 while being electrically insulated from the sealing member 23 by the upper first insulating member 21a and the lower first insulating member 21b.

An inversion plate 36 is welded to the end of the tubular portion 35a of the conductive member 35 located at the inner side of the battery such that the periphery of the inversion plate 36 is hermetically sealed. The inversion plate 36 is shaped to protrude slightly toward the inner side of the battery as it extends from the periphery to the center; that is, it is shaped to extend obliquely with respect to the sealing member 23. The inversion plate 36 is made of a conductive material and functions as a valve by deforming toward the outer side of the battery as the inner pressure of the prismatic outer casing 25 increases.

A thin region of the positive electrode current collector 17 is in contact with the center of the inversion plate 36 and is welded thereto with a laser at a plurality of positions. A second insulating member 37 having a through-hole is disposed between the positive electrode current collector 17 and the inversion plate 36, and the positive electrode current collector 17 is electrically connected to the inversion plate 36 via the through-hole. The second insulating member 37 and the positive electrode current collector 17 are fixed to each other. The positive electrode core exposed portion 16 is thus electrically connected to the positive electrode terminal 18 via the positive electrode current collector 17, the inversion plate 36, and the conductive member 35.

The tubular portion 35a of the conductive member 35 and the inversion plate 36 are components of the current interruption mechanism 27. The inversion plate 36 bulges toward the through-hole 18b in the positive electrode terminal 18 as the inner pressure of the prismatic outer casing 25 increases. When the inner pressure of the prismatic outer casing 25 exceeds a predetermined level, the thin region of the positive electrode current collector 17, which is welded to the center of the inversion plate 36, ruptures, thereby interrupting the electrical connection between the inversion plate 36 and the positive electrode current collector 17. The conductive member 35 may have a recess, and the inversion plate 36 may be welded to the conductive member 35 so as to seal the opening of the recess. The tubular portion 35a may have a circular or rectangular cross-section.

The specific methods of manufacture and compositions of the positive electrode plate 11, the negative electrode plate 12, the flat wound electrode assembly 14, and the nonaqueous electrolyte solution for the nonaqueous electrolyte secondary battery 10 will now be described.

Fabrication of Positive Electrode Plate

The positive electrode active material may be, for example, a lithium nickel cobalt manganese oxide represented by the formula $LiNi_{0.35}Co_{0.35}Mn_{0.30}O_2$. A positive electrode mixture slurry is prepared by weighing out the lithium nickel cobalt manganese oxide, carbon powder, which serves as a conductor, and polyvinylidene fluoride (PVdF), which serves as a binder, in a mass ratio of 88:9:3, adding lithium carbonate in an amount of 1.0% of the total mass of the ingredients (the total mass of the positive electrode mixture), and mixing N-methyl-2-pyrrolidone (NMP), which serves as a dispersion medium.

Lithium carbonate is preferably present in the positive electrode mixture in an amount of 0.1% to 5.0% by mass. If lithium carbonate is present in the positive electrode mixture in an amount of less than 0.1% by mass, the amount of carbon dioxide gas generated from the lithium carbonate is insufficient to quickly activate the current interruption mechanism 27. If lithium carbonate is present in the positive electrode mixture in an amount of more than 5.0% by mass, the battery capacity decreases because of the excess lithium carbonate, which does not contribute to the electrode reaction.

The positive electrode core is an aluminum foil having a thickness of 15 μm. The positive electrode mixture slurry prepared as described above is applied to both surfaces of the positive electrode core using a die coater. The slurry is not applied to a portion along one edge of the positive electrode core in the longitudinal direction (the same edge for both surfaces). This portion is exposed as a positive electrode core exposed portion. The coating is dried to remove the dispersion medium, i.e., NMP, and is pressed to a predetermined thickness by a roller press. The resulting electrode plate is cut to a predetermined size to form a positive electrode plate for use in the embodiment.

[Fabrication of Negative Electrode Plate]

The negative electrode plate may be fabricated as follows. A negative electrode mixture slurry is prepared by dispersing 98 parts by mass of graphite powder, 1 part by mass of carboxymethylcellulose (CMC), which serves as a thickener, and 1 part by mass styrene-butadiene rubber (SBR), which serves as a binder, in water. The negative electrode mixture slurry is applied to both surfaces of a negative electrode current collector made of a copper foil having a thickness of 10 μm using a die coater. The slurry is not applied to a portion along one edge of the negative electrode core in the longitudinal direction (the same edge for both surfaces). This portion is exposed as a negative electrode core exposed portion. The coating is dried and pressed to a predetermined thickness by a roller press. The resulting electrode plate is cut to a predetermined size to form a negative electrode plate for use in both the embodiment and the comparative examples.

[Preparation of Nonaqueous Electrolyte Solution]

The nonaqueous electrolyte solution may contain a mixture of ethylene carbonate (EC) and methyl ethyl carbonate (MEC) in a volume ratio (at 25° C. and 1 atm) of 3:7, which serves as a solvent, $LiPF_6$ in an amount of 1 mol/L, which serves as an electrolyte salt, and vinylene carbonate (VC) in an amount of 0.3% of the total mass of the nonaqueous electrolyte.

[Fabrication of Flat Wound Electrode Assembly]

The negative electrode plate 12 and the positive electrode plate 11 fabricated as described above are wound with the separator 13 therebetween so as to be insulated from each other such that the negative electrode plate 12 is located on the outermost side. The wound electrode assembly is deformed into a flat shape to form the flat wound electrode assembly 14.

[Fabrication of Prismatic Nonaqueous Electrolyte Secondary Battery]

As shown in FIGS. 2A to 2C and 3, the positive electrode terminal 18, the current interruption mechanism 27, the positive electrode current collector 17, the negative electrode terminal 20, and the negative electrode current collector 19 are attached to the sealing member 23, and the positive electrode current collector 17 and the negative electrode current collector 19 are attached to the flat wound electrode assembly 14. The flat wound electrode assembly 14 is then covered with the insulating sheet 24, which is made of, for example, a resin material. The thus-fabricated flat wound electrode assembly 14 covered with the insulating sheet 24 is inserted into the prismatic outer casing 25, and the sealing member 23 is fitted to the opening of the prismatic outer casing 25. The sealing member 23 and the prismatic outer casing 25 are welded together with a laser.

The nonaqueous electrolyte solution may be injected into the prismatic outer casing 25, for example, by placing the prismatic outer casing 25 having the sealing member 23 welded thereto with a laser in a vacuum chamber (also referred to as "reduced-pressure chamber"), inserting an injection tube, such as a syringe, containing the nonaqueous electrolyte solution to be injected into the electrolyte solution inlet 26, and reducing the inner pressure of the vacuum chamber. The preferred amount of nonaqueous electrolyte solution injected is experimentally determined in advance. The nonaqueous electrolyte solution injected into the prismatic outer casing 25 permeates through the separator 13 disposed between the positive electrode plate 11 and the negative electrode plate 12. The amount of nonaqueous electrolyte solution injected is larger than the amount with which the separator 13 can be impregnated since the nonaqueous electrolyte solution decomposes partially during charging and discharging. The excessively injected nonaqueous electrolyte solution is present in liquid form as excess nonaqueous electrolyte solution 40 (see FIG. 4) in the outer casing 25.

In the nonaqueous electrolyte secondary battery 10 according to the embodiment, the liquid level of the excess electrolyte solution 40 is at such a height that the excess electrolyte solution 40 does not come into contact with the components of the current interruption mechanism 27 when the prismatic outer casing 25 is placed horizontally. As shown in FIGS. 2A and 2B, the nonaqueous electrolyte secondary battery 10 is normally placed vertically during use with the sealing member 23 facing upward and the bottom surface 25c facing downward; therefore, the current interruption mechanism 27 is normally located above the flat wound electrode assembly 14, and the excess nonaqueous electrolyte solution 40 does not come into contact with the current interruption mechanism 27. However, the nonaqueous electrolyte secondary battery 10 may be placed horizontally during use with one wide side surface 25a or narrow side surface 25b of the prismatic outer casing 25 facing downward. As used herein, the term "placed horizontally" refers to placing an outer can having a bottom surface and side surfaces around the bottom surface with any side surface facing downward (i.e., being the lowest surface).

As shown in FIG. 4, if the prismatic outer casing 25 is placed horizontally with one wide side surface 25a being the bottom surface, the excess nonaqueous electrolyte solution 40 accumulates on the bottom surface, i.e., the wide side surface 25a. If there is a large amount of excess nonaqueous electrolyte solution 40, it may come into contact with both the components of the current interruption mechanism 27, particularly the conductive member 35, and the positive electrode current collector 17. In this state, after the current interruption mechanism 27 is activated to interrupt the electrical conduction between the positive electrode current collector 17 and the conductive member 35 and positive electrode terminal 18, the positive electrode current collector 17 and the conductive member 35 and positive electrode terminal 18 may conduct again through the excess electrolyte solution 40.

In the nonaqueous electrolyte secondary battery 10 according to the embodiment, the liquid level of the excess electrolyte solution 40 is at such a height that the excess electrolyte solution 40 does not come into contact with the components of the current interruption mechanism 27 when the prismatic outer casing 25 is placed horizontally with one wide side surface 25a being the bottom surface or is placed horizontally with one narrow side surface 25b being the bottom surface. This reduces the risk of the positive electrode current collector 17 and the conductive member 35 and positive electrode terminal 18 conducting again through the excess nonaqueous electrolyte solution 40 after the activation of the current interruption mechanism 27 upon overcharging of the nonaqueous electrolyte secondary battery 10, thus improving the safety thereof. Since there is only a small amount of excess nonaqueous electrolyte solution, little gas generated by the decomposition of the excess nonaqueous electrolyte solution 40, for example, upon overcharging, is absorbed by the excess nonaqueous electrolyte solution 40. This allows the current interruption mechanism 27 to be quickly activated.

The positive electrode mixture layer 11a (see FIG. 3) of the nonaqueous electrolyte secondary battery 10 according to the embodiment contains lithium carbonate. The lithium carbonate present in the positive electrode mixture layer 11a decomposes to generate carbon dioxide gas when the positive electrode potential rises upon overcharging. This carbon dioxide gas is generated independently of the gas generated by the decomposition of the nonaqueous electrolyte solution upon overcharging. This allows the current interruption mechanism 27 to be quickly activated before the activation of the gas release valve 28 upon overcharging of the nonaqueous electrolyte secondary battery 10, thus improving the safety upon overcharging. Carbon dioxide gas, which has no flammability, is resistant to combustion due to sparks that occur when the positive electrode current collector 17 and the positive electrode terminal 18 conduct again, thus improving the safety upon overcharging.

Although the positive electrode mixture layer in the embodiment described above contains lithium carbonate, the advantage of the positive electrode current collector 17 and the positive electrode terminal 18 being unlikely to conduct again after the activation of the current interruption mechanism 27 can also be achieved if the positive electrode mixture layer contains no lithium carbonate. Although the prismatic outer casing 25 of the nonaqueous electrolyte secondary battery 10 in the embodiment described above is placed horizontally with one wide side surface 25a being the bottom surface, the same advantage can also be achieved if the prismatic outer casing 25 is placed horizontally with one narrow side surface 25b being the bottom surface, provided that the liquid level of the excess electrolyte solution 40 is at such a height that the excess electrolyte solution 40 does not come into contact with the components of the current interruption mechanism 27.

In the embodiment described above, the positive electrode terminal 18 and the negative electrode terminal 20 are located above the flat wound electrode assembly 14; that is, the current interruption mechanism 27 is located above the flat wound electrode assembly 14. The present invention, however, does not include the case where the positive electrode terminal 18 and the negative electrode terminal 20 are located below the flat wound electrode assembly 14, that is, the case where the current interruption mechanism 27 is located below the flat wound electrode assembly 14, since this is not a normal form of use. Although the interruption mechanism 27 in the embodiment described above is provided for the positive electrode plate 11, it may be provided for the negative electrode plate 12 or for each of the positive electrode plate 11 and the negative electrode plate 12.

Although the nonaqueous electrolyte secondary battery in the embodiment described above is a prismatic battery, the same advantage can also be achieved if the nonaqueous electrolyte secondary battery is a cylindrical battery, provided that the liquid level of the excess electrolyte solution is at such a height that the excess electrolyte solution does not come into contact with the components of the current interruption mechanism 27 when the nonaqueous electrolyte secondary battery is placed horizontally.

The positive electrode active material used in the nonaqueous electrolyte secondary battery according to the present invention may be any compound that can reversibly absorb and release lithium ions. Examples of such positive electrode active materials include lithium transition metal oxides that can reversibly absorb and release lithium ions, including those represented by the formula $LiMO_2$ (where M is at least one of cobalt, nickel, and manganese), such as $LiCoO_2$, $LiNiO_2$, $LiNi_yCo_{1-y}O_2$ (where y=0.01 to 0.99), $LiMnO_2$, and $LiCo_xMn_yNi_zO_2$ (where x+y+z=1), as well as $LiMn_2O_4$ and $LiFePO_4$. These compounds may be used alone or in a mixture of two or more. Lithium cobalt oxides containing different metal elements such as zirconium, magnesium, and aluminum can also be used.

The solvent used for the nonaqueous electrolyte may be any solvent, including those conventionally used in nonaqueous electrolyte secondary batteries. Examples of such solvents include cyclic carbonates such as ethylene carbonate (EC), propylene carbonate (PC), butylene carbonate, and vinylene carbonate (VC); linear carbonates such as dimethyl carbonate (DMC), methyl ethyl carbonate (MEC), and diethyl carbonate (DEC); ester-containing compounds such as methyl acetate, ethyl acetate, propyl acetate, methyl propionate, ethyl propionate, and γ-butyrolactone; sulfo-containing compounds such as propane sultone; ether-containing compounds such as 1,2-dimethoxyethane, 1,2-diethoxyethane, tetrahydrofuran, 1,2-dioxane, 1,4-dioxane, and 2-methyltetrahydrofuran; nitrile-containing compounds such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and amide-containing compounds such as dimethylformamide. Particularly preferred are those in which some hydrogen atoms are replaced with fluorine atoms. These solvents may be used alone or in combination. Combinations of cyclic carbonates and linear carbonates and combinations thereof with small amounts of nitrile-containing compounds or ether-containing compounds are preferred.

The nonaqueous solvent used for the nonaqueous electrolyte may also be an ionic liquid. The ionic liquid may be composed of any cation and anion. Combinations of pyridinium, imidazolium, or quaternary ammonium cations with fluorine-containing imide anions are preferred for their low viscosity, electrochemical stability, and hydrophobicity.

The solute used as the nonaqueous electrolyte may be a lithium salt commonly known and used in nonaqueous electrolyte secondary batteries. Examples of such lithium salts include lithium salts containing at least one element selected from phosphorus, boron, fluorine, oxygen, sulfur, nitrogen, and chlorine, specifically, lithium salts such as $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, $LiClO_4$, $LiPF_2O_2$, and mixtures thereof. $LiPF_6$ is preferred to improve the high-rate charge-discharge characteristics and durability of the nonaqueous electrolyte secondary battery.

If the nonaqueous electrolyte contains lithium difluorophosphate ($LiPF_2O_2$), it reacts with lithium to form a high-quality protective coating on the surfaces of the positive and negative electrode plates during initial charging and discharging. This protective coating inhibits contact between the positive electrode active material and carbon dioxide gas so that the carbon dioxide gas moves easily through the wound electrode assembly and also decreases the reaction resistance of the positive electrode. Lithium difluorophosphate is preferably present in an amount of 0.1% to 2% by mass of the positive electrode mixture. If lithium difluorophosphate is present in an amount of less than 0.1% by mass, the addition of lithium difluorophosphate is not effective. If lithium difluorophosphate is present in an amount of more than 2% by mass, the nonaqueous electrolyte solution has high viscosity, which results in poor power characteristics.

The solute may also be a lithium salt containing an oxalato complex anion. Examples of lithium salts containing an oxalato complex anion include lithium bisoxalate borate (LiBOB) and lithium salts containing an anion having $C_2O_4^{2-}$ coordinated to the central atom thereof, for example, those represented by the formula $Li[M(C_2O_4)_xR_y]$ (where M is a transition metal or an element selected from Groups 13, 14, and 15 in the periodic table; R is a group selected from halogen, alkyl, and halogen-substituted alkyl; x is a positive integer; and y is 0 or a positive integer). Specific examples include $Li[B(C_2O_4)F_2]$, $Li[P(C_2O_4)F_4]$, and $Li[P(C_2O_4)_2F_2]$. Most preferred is LiBOB, which forms a stable coating on the surface of the negative electrode in a high-temperature environment. LiBOB is preferably present in an amount of 0.5% to 2% by mass of the positive electrode mixture. If LiBOB is present in an amount of less than 0.5% by mass, the power retention after charge-discharge cycling is insufficient. If LiBOB is present in an amount of more than 2% by mass, LiBOB does not dissolve.

These solutes may be used alone or in a mixture of two or more. The solute concentration is preferably, but not necessarily, 0.8 to 1.7 mol per litter of the nonaqueous electrolyte solution. For applications requiring high-current discharge, the solute concentration is preferably 1.0 to 1.6 mol per litter of the nonaqueous electrolyte solution.

In one aspect of the present invention, the negative electrode active material used for the negative electrode of the nonaqueous electrolyte secondary battery may be any negative electrode active material capable of reversibly absorbing and releasing lithium. Examples of such negative electrode active materials include carbonaceous materials, metallic lithium, metal and alloy materials capable of alloying with lithium, and metal oxides. Carbonaceous materials are preferably used as the negative electrode active material for reasons of material cost. Examples of carbonaceous materials include natural graphite, synthetic graphite, mesophase pitch-based carbon fiber (MCF), mesocarbon microbeads (MCMB), coke, and hard carbon. To improve the high-rate charge-discharge characteristics, carbonaceous materials prepared by coating graphite materials with low-crystallinity carbon are preferably used as the negative electrode active material.

The separator may be a separator commonly known and used in nonaqueous electrolyte secondary batteries. Examples of such separators include polyethylene separators, polyethylene separators having polypropylene layers thereon, and polyethylene separators coated with aramid resins.

A layer containing a conventionally used inorganic filler may be formed between the positive electrode and the separator or between the negative electrode and the separator. Examples of conventionally used fillers include oxides and phosphates containing one or more elements such as titanium, aluminum, silicon, and magnesium and those treated with compounds such as hydroxides. The filler layer may be formed, for example, by directly applying a filler-containing slurry to the positive electrode, the negative electrode, or the separator, or by laminating a sheet formed from the filler on the positive electrode, the negative electrode, or the separator.

The following alternative inventions are possible.

[First Alternative Invention]

A nonaqueous electrolyte secondary battery including:
a prismatic outer casing having an opening;
a sealing member sealing the opening; and
an electrode assembly including a positive electrode plate and a negative electrode plate, wherein
the positive electrode plate contains lithium carbonate,
the nonaqueous electrolyte secondary battery further includes a forced short circuit mechanism that forcedly causes a short circuit between the positive electrode plate and the negative electrode plate when the inner pressure of the prismatic outer casing is at or above a predetermined level, and
the forced short circuit mechanism is disposed outside the electrode assembly.

When the nonaqueous electrolyte secondary battery including the forced short circuit mechanism is overcharged, the inner pressure of the battery rises, for example, because of the gases generated by the decomposition of the electrolyte and the additives. The pressure-responsive forced short circuit mechanism is activated when the inner pressure of the battery exceeds a predetermined level. This prevents the charging current from flowing into the electrode assembly and also allows energy to be quickly released from the electrode assembly, thereby ensuring safety upon overcharging.

The activation of the forced short circuit mechanism may involve sparks. These sparks may perforate the valve forming the forced short circuit mechanism and enter the battery.

If the battery is filled with any flammable gas, the flammable gas may be ignited, causing the battery to catch fire. According to the above invention, when the battery is overcharged, the battery can be filled with carbon dioxide gas generated by the decomposition of lithium carbonate, or the content of carbon dioxide gas in the battery can be increased. This prevents the battery from catching fire when sparks occur in the battery or enter the battery, thereby ensuring a higher level of safety.

Figure 5:
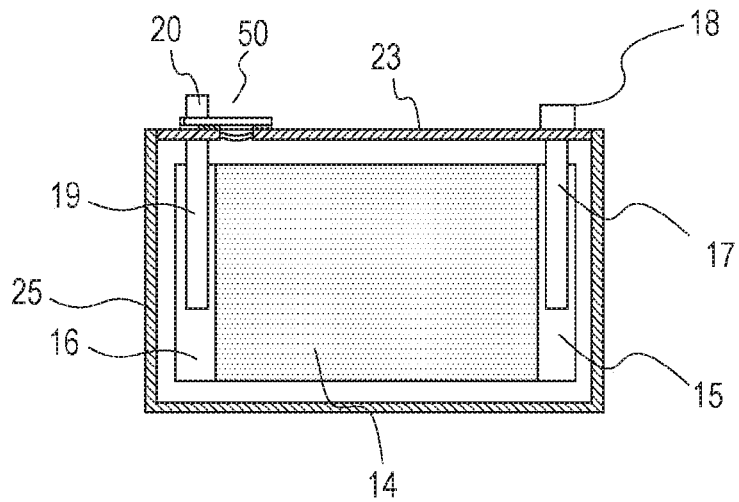
FIG. 5 is a partial sectional view of a nonaqueous electrolyte secondary battery according to another invention.

As shown in FIG. 5, the forced short circuit mechanism is preferably provided in the sealing member.

Figure 6A:
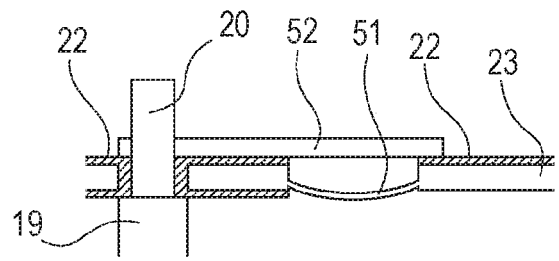
FIG. 6 shows enlarged views of FIG. 5.
Figure 6B:
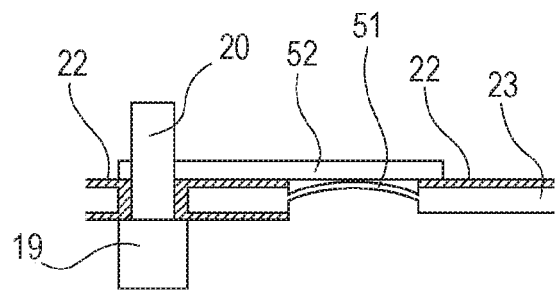

FIG. 6 shows enlarged views of a portion including a forced short circuit mechanism 50 in FIG. 5. FIG. 6A shows the normal state of the forced short circuit mechanism 50, and FIG. 6B shows the state of the forced short circuit mechanism 50 after activation.

As shown in FIG. 6A, a metal sealing member 23 includes a valve 51 electrically connected to the positive electrode plate 11, and a plate-shaped conductive member 52 electrically connected to the negative electrode plate 12 is disposed outside the valve 51. The valve 51, which is made of a metal, may be integrally formed with the sealing member 23. Alternatively, a separate valve 51 may be connected to the sealing member 23. The conductive member 52 is connected to the negative electrode terminal 20 and is electrically connected to the negative electrode plate 12 via the negative electrode current collector 19. The conductive member 52, the negative electrode terminal 20, and the negative electrode current collector 19 are electrically insulated from the sealing member 23 by the insulating member 22.

As shown in FIG. 6B, when the inner pressure of the battery rises to a predetermined level or higher upon overcharging, the valve 51 is deformed outward (in FIG. 6, upward) and comes into contact with the conductive member 52. The contact between the valve 51, which is made of a metal and is electrically connected to the positive electrode plate 11, and the conductive member 52, which is electrically connected to the negative electrode plate 12, causes a short circuit between the positive electrode plate 11 and the negative electrode plate 12. This short circuit occurs outside the electrode assembly and does not cause an exothermic reaction in the active material layers, unlike a short circuit inside the electrode assembly, thus preventing the battery from rupturing or catching fire. However, if the battery is filled with any flammable gas, the flammable gas in the battery may be ignited by sparks that occur in the event of a short circuit. According to the above invention, the battery can be filled with carbon dioxide gas, or a high partial pressure of carbon dioxide gas can be created in the battery. This prevents the battery from catching fire due to sparks.

[Second Alternative Invention]

A nonaqueous electrolyte secondary battery including:

a prismatic outer casing having an opening, a pair of large-area sidewalls, a pair of small-area sidewalls, and a bottom;

a sealing member sealing the opening; and a plurality of flat wound electrode assemblies, each including a positive electrode plate and a negative electrode plate, wherein each flat wound electrode assembly includes a wound positive electrode core exposed portion at one end in a winding axis direction and a wound negative electrode core exposed portion at another end in the winding axis direction, the plurality of flat wound electrode assemblies are housed in the prismatic outer casing such that each wound positive electrode core exposed portion faces one of the pair of small-area sidewalls and each wound negative electrode core exposed portion faces the other small-area sidewall, and the nonaqueous electrolyte secondary battery further includes a pressure-responsive safety mechanism disposed closer to the sealing member than the flat wound electrode assemblies.

Preferably, when the nonaqueous electrolyte secondary battery in which the pressure-responsive safety mechanism is disposed closer to the sealing member than the flat wound electrode assemblies is overcharged, gas generated inside each wound electrode assembly is released outside the wound electrode assembly from an end of the wound electrode assembly in the winding axis direction and flows smoothly into the space between the wound electrode assemblies and the sealing member. For example, when the battery is overcharged, little gas generated inside each wound electrode assembly may be released from the wound electrode assembly if the gas deforms the wound electrode assembly or other components. In this case, the gas passage may be blocked, and the gas may accumulate in the wound electrode assembly and interfere with the gas-generating reaction.

Figure 7:
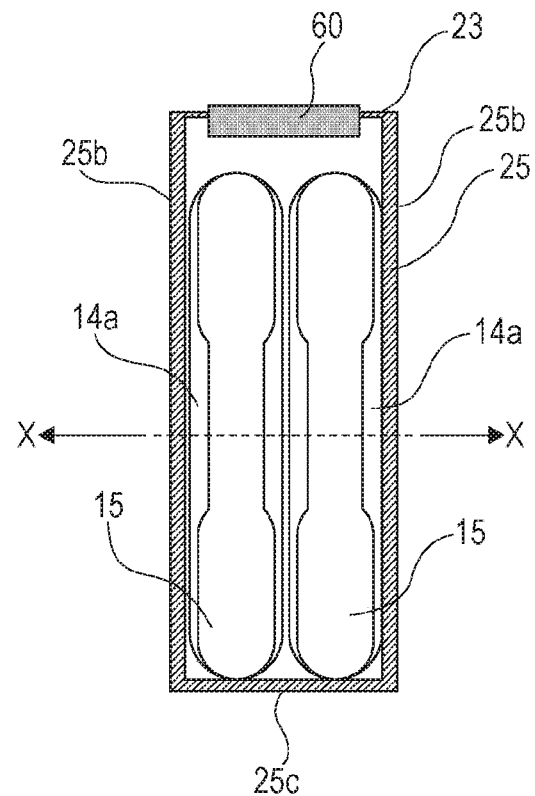
FIG. 7 is a partial sectional view of a nonaqueous electrolyte secondary battery according to another invention.

FIG. 7 shows a nonaqueous electrolyte secondary battery according to the second alternative invention. FIG. 7, which corresponds to FIG. 2C, is a sectional view as viewed from one of the small-area sidewalls of the prismatic outer casing 25. As shown in FIG. 7, two flat wound electrode assemblies 14 are housed in the prismatic outer casing 25 such that the winding axes thereof are parallel to the bottom 25c of the prismatic outer casing 25. An end of each wound positive electrode core exposed portion 15 in the winding axis direction is located opposite one of the small-area sidewalls directly or with an insulating sheet therebetween. In this case, there is only a short distance between the end of the wound positive electrode core exposed portion 15 in the winding axis direction and the small-area sidewall of the prismatic outer casing 25, and little gas generated inside the wound electrode assembly 14 may move toward the sealing member 23.

Figure 8:
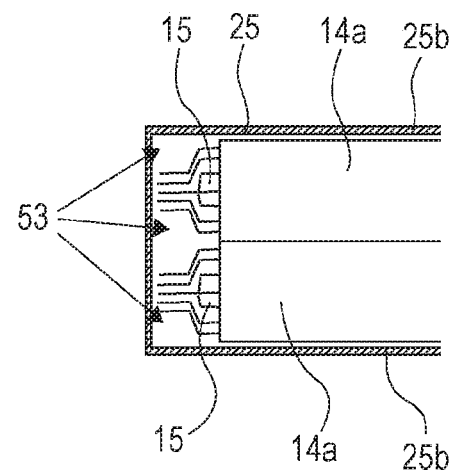
FIG. 8 is a partial sectional view taken along line X-X in FIG. 7.

According to the above invention, however, as shown in FIG. 7, gas passages 53 can be formed between the large-area sidewalls 25b of the prismatic outer casing 25 and the wound positive electrode core exposed portions 15 and between the positive electrode core exposed portions 15. The gas generated inside the wound electrode assemblies 14 can thus be more smoothly released toward the sealing member 23 than in the case where a single flat electrode assembly 14 is housed in the prismatic outer casing 25. This reduces the interference of gas accumulated in the wound electrode assemblies 14 with the gas-generating reaction and thus provides a safer nonaqueous electrolyte secondary battery. FIG. 8 is a partial sectional view taken along line X-X in FIG. 7. As shown in FIG. 8, the width of the wound positive electrode core exposed portions 15 (i.e., the width perpendicular to the large-area sidewalls 25b) is smaller than the width of the central portions 14a (i.e., the portions in which the positive and negative electrode plates are wound with the separator therebetween) of the wound electrode assemblies 14. The gas passages 53 can thus be formed between the large-area sidewalls 25b of the prismatic outer casing 25 and the wound positive electrode core exposed portions 15 and between the wound positive electrode core exposed portions 15.

Figure 9:
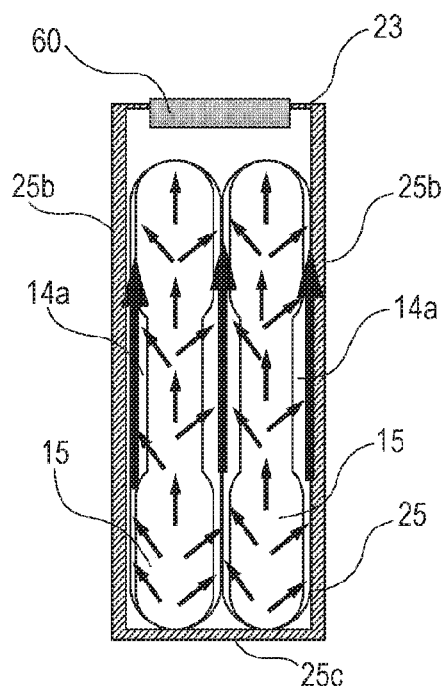
FIG. 9 is a partial sectional view of a nonaqueous electrolyte secondary battery according to another invention.
Figure 10:
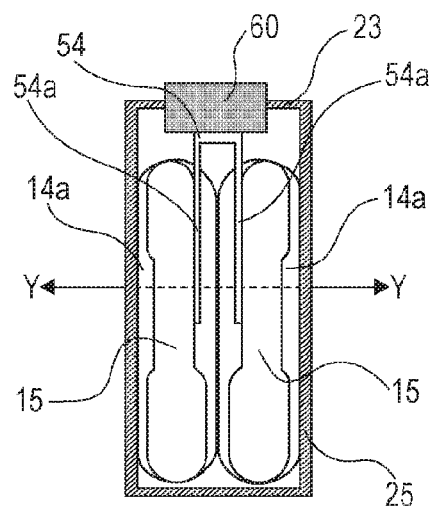
FIG. 10 is a partial sectional view of a nonaqueous electrolyte secondary battery according to another invention.
Figure 11:
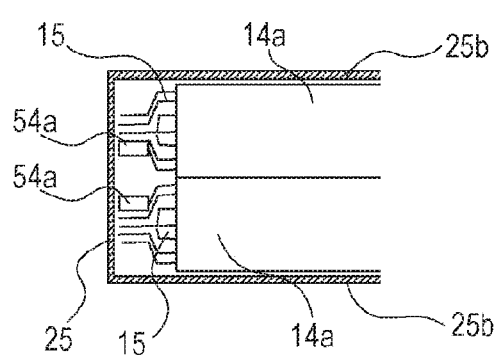
FIG. 11 is a partial sectional view taken along line Y-Y in FIG. 10.

The wound positive electrode core exposed portions 15 preferably include narrow bundled portions, which allow the gas passages 53 to have a larger cross-sectional area. FIG. 9 shows the flow of the gas generated inside the wound electrode assemblies 14. In FIG. 9, the gas flow is indicated by the arrows. No current collector is shown in FIGS. 7 to 9. As shown in FIG. 10, a current collector 54 is preferably a folded plate including a pair of connection parts 54a. The connection part 54a is preferably connected to the outer surface of the wound positive electrode core exposed portion 15 of one wound electrode assembly 14 opposite the wound positive electrode core exposed portion 15 of the other wound electrode assembly 14. The other connection part 54a is preferably connected to the outer surface of the wound positive electrode core exposed portion 15 of the other wound electrode assembly 14 opposite the wound positive electrode core exposed portion 15 of the one wound electrode assembly 14. As shown in FIG. 11, the current collector 54 is shaped to form a space between the pair of connection parts 54a so that a gas passage 53 can be reliably formed between the wound positive electrode core exposed portions 15.

A pressure-responsive safety mechanism 60 is a current interruption mechanism formed in the conduction path between the positive electrode plate and the positive electrode terminal or in the conduction path between the negative electrode plate and the negative electrode terminal, or is a forced short circuit mechanism that forcedly causes a short circuit between the positive and negative electrode plates. The positive electrode plate preferably contains lithium carbonate to quickly activate the pressure-responsive safety mechanism 60 when the battery is overcharged. More preferably, the positive electrode mixture layer contains lithium carbonate.

The wound positive electrode core exposed portions are preferably bundled and connected to the positive electrode current collector.

Although the wound positive electrode core exposed portions may be bundled at two lateral positions, as shown in FIG. 2C, they are preferably bundled at one position to form wider gas passages. As shown in FIG. 7, the wound positive electrode core exposed portions preferably include a thin region in the center thereof and a thick region above and below the thin region as viewed in the winding axis direction. The wound positive electrode core exposed portions and the wound negative electrode core exposed portions need not be disposed directly opposite the small-area sidewalls of the prismatic outer casing, but may be disposed with insulating sheets therebetween.

REFERENCE SIGNS LIST 10 nonaqueous electrolyte secondary battery
11 positive electrode plate
11a positive electrode mixture layer
12 negative electrode plate
12a negative electrode mixture layer
13 separator
14 flat wound electrode assembly
15 positive electrode core exposed portion
15a weld
16 negative electrode core exposed portion
17 positive electrode current collector
18 positive electrode terminal
18a tubular portion
18b through-hole
19 negative electrode current collector
20 negative electrode terminal
21 insulating member
21a upper first insulating member
21b lower first insulating member
22 insulating member
23 sealing member
24 insulating sheet
25 prismatic outer casing
26 electrolyte solution inlet
27 current interruption mechanism
28 gas release valve
29 positive electrode conductive member
30 positive electrode intermediate member
31 negative electrode conductive member
32 negative electrode intermediate member
33, 34 weld
35 conductive member
35a tubular portion
36 inversion plate
37 second insulating member
38 metal plate
40 excess nonaqueous electrolyte solution
50 forced short circuit mechanism
51 valve
52 conductive member
53 gas passage
54 current collector
54a connection part
60 pressure-responsive safety mechanism

The invention claimed is:

1. A nonaqueous electrolyte secondary battery comprising:
a positive electrode plate including a positive electrode core and a positive electrode mixture layer formed thereon;
a negative electrode plate including a negative electrode core and a negative electrode mixture layer formed thereon;
a wound electrode assembly in which the positive electrode plate and the negative electrode plate are wound with a separator therebetween so as to be insulated from each other;
a nonaqueous electrolyte solution;
a pressure-responsive current interruption mechanism electrically connected to at least one of the positive electrode plate and the negative electrode plate; and
an outer casing, wherein
excess electrolyte solution is present outside the electrode assembly in the outer casing,
the outer casing includes a prismatic outer casing that has an opening defined therein, and a sealing member to seal the opening,
the prismatic outer casing includes a bottom wall, a first sidewall, a second sidewall, a third sidewall, and a fourth sidewall,
the bottom wall is disposed opposite the sealing member,
the first sidewall is disposed opposite the second sidewall,
the third sidewall is disposed opposite the fourth sidewall,
the first and second sidewalls are larger in area than the third and fourth sidewalls, and
the liquid level of the excess electrolyte solution is at such a height that when the battery is in a horizontal position in which the first sidewall lies horizontally and below the second sidewall, the liquid level of the excess electrolyte solution is vertically lower than a portion of the current interruption mechanism which is closest to the first sidewall.

2. The nonaqueous electrolyte secondary battery according to claim 1, wherein
the current interruption mechanism comprises a conductive member having a recess and an inversion plate welded to the conductive member so as to seal an opening of the recess in the conductive member, and the liquid level of the excess electrolyte solution is at such a height that when the battery is in a position in which the first sidewall lies horizontally and below the second sidewall, the liquid level of the excess electrolyte solution is vertically lower than one of the conductive member and the inversion plate which is closer to the first sidewall.

3. The nonaqueous electrolyte secondary battery according to claim 2, wherein the conductive member includes a tubular portion, and the inversion plate is welded to an end of the tubular portion so as to seal an opening of the tubular portion.

4. The nonaqueous electrolyte secondary battery according to claim 2, wherein the positive electrode mixture layer contains lithium carbonate.

5. The nonaqueous electrolyte secondary battery according to claim 4, wherein lithium carbonate is present in the positive electrode mixture layer in an amount of 0.1% to 5% by mass of the positive electrode mixture.

6. The nonaqueous electrolyte secondary battery according to claim 5, wherein the outer casing is prismatic.

7. The nonaqueous electrolyte secondary battery according to claim 2, wherein an insulating member is disposed between the sealing member and the conductive member, and the sealing member is electrically insulated from the conductive member.

8. The nonaqueous electrolyte secondary battery according to claim 2, wherein a current collector is connected to at least one of the positive electrode plate and the negative electrode plate, and the current collector is welded to the inversion plate.

9. The nonaqueous electrolyte secondary battery according to claim 2, further comprising:

an electrode terminal, wherein the sealing member includes a first through hole defined therein, the conductive member includes a second through hole defined therein, the electrode terminal is inserted through the first through hole and the second through hole, the electrode terminal is electrically insulated from the sealing member, and the electrode terminal is electrically connected with the conductive member.

10. The nonaqueous electrolyte secondary battery according to claim 2, wherein the prismatic outer casing is formed of aluminum or aluminum alloy, the sealing member is formed of aluminum or aluminum alloy, and the sealing member is electrically insulated from the inversion plate.

11. The nonaqueous electrolyte secondary battery according to claim 1, wherein an insulating sheet is disposed between the wound electrode assembly and the first sidewall, and the excess electrolyte solution contacts the insulating sheet where the battery is in the horizontal position.

12. The nonaqueous electrolyte secondary battery according to claim 11, wherein the liquid level of the excess electrolyte solution is above an upper surface of the insulating sheet when the battery is in the horizontal position.

13. The nonaqueous electrolyte secondary battery according to claim 2, wherein the wound electrode assembly is not liquid-sealed with respect to the conductive member and the inversion plate inside the prismatic outer casing.

14. A nonaqueous electrolyte secondary battery comprising:

a positive electrode plate including a positive electrode core and a positive electrode mixture layer formed thereon;

a negative electrode plate including a negative electrode core and a negative electrode mixture layer formed thereon;

a wound electrode assembly in which the positive electrode plate and the negative electrode plate are wound with a separator therebetween so as to be insulated from each other;

a nonaqueous electrolyte solution;

a pressure-responsive current interruption mechanism electrically connected to at least one of the positive electrode plate and the negative electrode plate; and an outer casing, wherein excess electrolyte solution is present outside the electrode assembly in the outer casing, the current interruption mechanism comprises a conductive member having a recess and an inversion plate welded to the conductive member so as to seal an opening of the recess in the conductive member, and the liquid level of the excess electrolyte solution is at such a height that the excess electrolyte solution does not come into contact with the conductive member and the inversion plate when the outer casing is placed horizontally, the outer casing includes a prismatic outer casing and a sealing member, an insulating member is disposed between the sealing member and the conductive member, and the sealing member is electrically insulated from the conductive member.

15. The nonaqueous electrolyte secondary battery according to claim 14, further comprising:

a current collector connected to at least one of the positive electrode plate and the negative electrode plate, wherein the current collector is welded to the inversion plate.

16. The nonaqueous electrolyte secondary battery according to claim 15, wherein the prismatic outer casing is formed of aluminum or aluminum alloy, the sealing member is formed of aluminum or aluminum alloy, and the sealing member is electrically insulated from the inversion plate.

17. The nonaqueous electrolyte secondary battery according to claim 16, further comprising:

an electrode terminal, wherein the sealing member includes a first through hole defined therein, the conductive member includes a second through hole defined therein, the electrode terminal is inserted through the first through hole and the second through hole, the electrode terminal is electrically insulated from the sealing member, and the electrode terminal is electrically connected with the conductive member.

18. The nonaqueous electrolyte secondary battery according to claim 14, wherein an insulating sheet is disposed between the wound electrode assembly and a first sidewall, and the excess electrolyte solution contacts the insulating sheet where the battery is in a horizontal position.

19. The nonaqueous electrolyte secondary battery according to claim 14, wherein an insulating sheet is disposed between the wound electrode assembly and a first sidewall, and the liquid level of the excess electrolyte solution is above an upper surface of the insulating sheet when the battery is in a horizontal position.

20. The nonaqueous electrolyte secondary battery according to claim 14, wherein the wound electrode assembly is not liquid-sealed with respect to the conductive member and the inversion plate inside the prismatic outer casing.

* * * * *